United States Patent
Calder et al.

(10) Patent No.: US 7,580,561 B2
(45) Date of Patent: Aug. 25, 2009

(54) IMAGE PROCESSING APPARATUS AND METHOD

(75) Inventors: Keith Robert Calder, Ashford (GB); Nordine Chaibelaine, Anthony (FR); Stuart Jonathan Levine, Stockbridge (GB)

(73) Assignee: Sony United Kingdom Limited, Weybridge (GB)

( * ) Notice: Subject to any disclaimer, the term of this patent is extended or adjusted under 35 U.S.C. 154(b) by 715 days.

(21) Appl. No.: 10/505,319

(22) PCT Filed: Feb. 7, 2003

(86) PCT No.: PCT/GB03/00558
§ 371 (c)(1),
(2), (4) Date: Mar. 14, 2005

(87) PCT Pub. No.: WO03/071782

PCT Pub. Date: Aug. 28, 2003

(65) Prior Publication Data
US 2005/0207662 A1 Sep. 22, 2005

(30) Foreign Application Priority Data
Feb. 22, 2002 (GB) ................. 0204237.2

(51) Int. Cl.
*G06K 9/00* (2006.01)
(52) U.S. Cl. .............. 382/162; 382/166; 382/232; 382/233
(58) Field of Classification Search .......... 382/232, 382/166, 167, 233, 234; 348/238, 234, 678; 358/518, 520
See application file for complete search history.

(56) References Cited
U.S. PATENT DOCUMENTS
4,533,936 A * 8/1985 Tiemann et al. .......... 348/386.1
4,597,005 A * 6/1986 Baleshta et al. ............ 348/472
(Continued)

FOREIGN PATENT DOCUMENTS
EP 0 283 627 9/1988
(Continued)

OTHER PUBLICATIONS
Hirohisa Yamaguchi "Vector Quantization of f Differential Luminance and Chrominance Signals" IEEE Transactions on Communications, vol. COM-33, No. 5, May 1985, pp. 457-465.*
(Continued)

*Primary Examiner*—Samir A. Ahmed
*Assistant Examiner*—Mekonen Bekele
(74) *Attorney, Agent, or Firm*—Oblon, Spivak, McClelland, Maier & Neustadt, P.C.

(57) ABSTRACT

A compression and de-compression arrangement is provided for a display device having a display memory and a display. The arrangement includes a color processor which reduces the color samples by processing a pair of pixels to produce first and second luminance values and forming first and second output chrominance values from the pair of pixels. The first and second output chrominance values are formed by calculating for each pixel the corresponding U and V chrominance values and forming the first and second chrominance values (U, V) from the average of the values for each pixel.

Forming the compressed representation of the color image provides an advantage when recovering the original image, particularly for example where the image contains detail and/or text. The image processing apparatus of the system receives the group of color component signal samples from the display memory and generates first and second output pixels, each comprising three color component values (R, G, B), from each group. The image processing apparatus includes a detail detection processor, which detects whether either of the pixels represented by each group of signal samples represents white or black and the other does not. This may be representative of one of the pixels being part of a text character or detail. Accordingly, in order to improve the likelihood of preserving the text and detail in the reproduced image, the de-compressing processor is arranged to assign the chrominance values (U1, V1) of one of the pixels to zero. The other chrominance value (U2, V2) of the other pixel is assigned the value of twice the value of the first and second input chrominance values respectively.

10 Claims, 5 Drawing Sheets

U.S. PATENT DOCUMENTS

| | | | | |
|---|---|---|---|---|
| 5,182,635 | A * | 1/1993 | Nakashima et al. | 348/14.12 |
| 5,621,819 | A * | 4/1997 | Hozumi | 382/232 |
| 5,872,556 | A * | 2/1999 | Rackley et al. | 345/603 |
| 5,875,044 | A * | 2/1999 | Seto et al. | 358/518 |
| 5,909,254 | A * | 6/1999 | Feig et al. | 348/660 |
| 6,072,539 | A | 6/2000 | Harlos et al. | |
| 6,108,048 | A * | 8/2000 | Rinaldi | 348/665 |
| 6,154,288 | A * | 11/2000 | Watanabe | 358/1.9 |
| 6,535,663 | B1 * | 3/2003 | Chertkow | 385/18 |
| 6,553,459 | B1 * | 4/2003 | Silverbrook et al. | 711/115 |
| 6,614,471 | B1 * | 9/2003 | Ott | 348/238 |
| 6,937,774 | B1 * | 8/2005 | Specht et al. | 382/254 |
| 7,113,227 | B1 * | 9/2006 | Kakuya et al. | 348/678 |
| 7,149,350 | B2 * | 12/2006 | Shoda et al. | 382/166 |
| 7,257,251 | B2 * | 8/2007 | Matthews | 382/167 |

FOREIGN PATENT DOCUMENTS

| | | | |
|---|---|---|---|
| WO | WO 93/14600 | | 7/1993 |
| WO | WO-9722206 | * | 6/1997 |

OTHER PUBLICATIONS

Marek Domuliski, Krzyszto Rakowski "Lossless and Near-Lossless Image Compression With Color Transformations" IEEE 2001, pp. 445-457.*

Patent Abstracts of Japan; Publication No. 2000070267; Publication Date Mar. 7, 2000.

* cited by examiner

Text in 16 font
Text in 16 font
Text in 16 font
Text in 16 font
Text in 12 font
Text in 12 font
Text in 12 font
Text in 12 font

Fig. 3(a)

Text in 16 font
Text in 16 font
Text in 16 font
Text in 16 font
Text in 12 font
Text in 12 font
Text in 12 font
Text in 12 font

Fig. 3(b)

Text in 16 font
Text in 16 font
Text in 16 font
Text in 16 font
Text in 12 font
Text in 12 font
Text in 12 font
Text in 12 font

Fig. 7(a)

Text in 16 font
Text in 16 font
Text in 16 font
Text in 16 font
Text in 12 font
Text in 12 font
Text in 12 font
Text in 12 font

Fig. 7(b)

IMAGE PROCESSING APPARATUS AND METHOD

FIELD OF THE INVENTION

The present invention relates to colour processors operable to process input pixels representing a colour image to form groups of output colour component signal samples, wherein the number of samples representing the image is preferably reduced.

The present invention also relates to image processing apparatus operable to reproduce pixels representative of a colour image from groups of colour component signal samples, each group representing a pair of pixels having two luminance and first and second chrominance samples.

BACKGROUND OF THE INVENTION

It is known in the technical field of colour image processing to convert the red, green and blue (RGB) colour component signal samples of pixels representing an image into groups of component signal samples each having a luminance (Y) and two chrominance samples (U, V). Representing the RGB pixels as YUV signal samples provides a facility for reducing an amount of information, which must be communicated to represent a colour image. The reduction can be arranged by reducing or discarding some of the chrominance information without or with a reduced likelihood of causing a noticeable degradation to the reproduced image. This is because the human eye is less sensitive to loss of chrominance (colour) information from an image than luminance information.

The human eye's reduced sensitivity to loss of chrominance information can be used to reduce an amount of information, which is required to store a colour image. For example, it is known to reduce a number of samples required to store a digital colour image by converting pixels having RGB components into YUV form, discarding the UV chrominance values for every other pixel and storing the luminance value Y and storing the other chrominance values. The format of the resulting stored colour image is known as 4:2:2. When the colour image is reproduced, the UV chrominance values which have been discarded are reproduced from the UV chrominance values which have been stored.

For some applications, such as for hand held personal digital assistants or mobile radiotelephones having display devices, a reduction in an amount of information required to represent an image is particularly advantageous. Reducing the amount of information required to represent the image can provide an advantage, for example, with respect to the cost of the device as a result of a reduction in the size of a memory for storing the image. However, as far as possible, such a reduction in the amount of information required to represent an image should not affect the quality of the reproduced image.

SUMMARY OF THE INVENTION

According to the present invention there is provided a colour processor operable to process input pixels, each comprising three colour component signal samples, to produce output colour component signal samples. The colour processor is operable to receive first and second input pixels and to generate from each pixel a luminance value from the corresponding three colour component samples of each pixel respectively. The colour processor forms first and second output chrominance values for each of the first and second input pixels. The output chrominance values are formed by calculating from each of the colour components of each input pixel first and second chrominance values, and averaging the values of the first chrominance value of the first and second input pixels and averaging the second chrominance values of the first and second input pixels. The first and second output chrominance values are produced from the averaged first and second chrominance values respectively. The output colour component signal samples are formed for the first and second input pixels from the luminance value for each pixel and the first and second output chrominance values.

Embodiments of the present invention provide a colour processor, which is arranged to reduce a number of signal samples, which are required to represent a colour image. The reduction is provided by representing a pair of pixels as two luminance value signal samples (Y1,Y2) and first and second chrominance values (UV). As a result a capacity of a memory which is required to store a representation of the image is reduced by two samples for each pixel pair. This represents a reduction of 33%.

Effectively the colour processor is arranged to compress the colour image by discarding colour information. Therefore, as with conventional colour YUV 4:4:4 to 4:2:2, the compression process is lossy. However, unlike conventional processing a colour processor embodying the invention, forms two chrominance values UV for each pair of pixels by calculating the corresponding chrominance values for the first pixel U1V1, and calculating the chrominance values for the second pixel U2V2. The two output chrominance values UV are then formed by averaging the two corresponding values U1V1, U2V2 to produce a common value UV for the pixel pair. Forming the two-chrominance values UV for a pair of pixels provides a reduction in the number of samples required to represent the image. Furthermore, the reduction is produced in a way which provides a facility for improving the likelihood of maintaining text and other detail which may be present in the image, which may be lost if the chrominance values for the second pixel are simply discarded as with conventional processing.

According to an aspect of the present invention there is provided an image processing apparatus operable to reproduce pixels representative of a colour image from groups of colour component signal samples representing the image. Each of the groups represents two of the pixels and comprises two input luminance values, one for each pixel, and first and second input chrominance values formed by averaging first and second chrominance values for each pixel. The apparatus comprises a de-compressing processor operable to receive the groups of colour component signal samples and to generate output pixels each comprising three colour component values. The apparatus also comprises a detail detection processor operable to detect whether one of the first and second pixels is representative of substantially white or substantially black and the other of the pixels is not representative of substantially white or substantially black. If so, the de-compressing processor is arranged to assign to first and second chrominance values for one of the first and second pixels representing substantially white or substantially black the value of zero, to assign to first and second chrominance values for the other of the first and second pixels, not representing substantially white or black, the value of twice the first and second input chrominance values respectively. The de-compressing processor then reproduces the three colour components of each pixel from the corresponding input luminance value of each pixel and the assigned first and second chrominance values. Otherwise, the de-compressing processor is operable to reproduce the three colour components of each output pixel from the corresponding input luminance value in combination with the first and second input chrominance values.

Forming a compressed representation of the colour image by averaging the two-chrominance values for a pair of pixels provides an advantage when recovering the original image, particularly for example where the image contains text and/or detail. Embodiments of the present invention provide an image processing apparatus including a de-compressing processor and a detail detection processor. The detail detection processor determines whether one of the two pixels represented by each group is representative of substantially white or substantially black and the other pixel is representative of not being substantially white or substantially black. Detecting white or black in only one of the pixels is likely to correspond to the pixel pair representing part of a text character or detail. Accordingly, in order to increase the likelihood of preserving the text and detail in the reproduced image, once black or white has been detected in one of the two pixels, the de-compressing processor is arranged to assign chrominance values (U1, V1) for one of the pixels, representing white or black to zero. The chrominance values (U2, V2) for the other pixel not representing white or black is assigned the value of twice the value of the first and second input chrominance values respectively. Assigning these values to the chrominance samples of the pixels to be reproduced has an effect that the RGB components of the reproduced pixels are more likely to reflect the pixel values of the original image, even though the compression process was lossy. As a result the text information or detail information is preserved in the reproduced image. In contrast, conventional compression techniques, which discard the chrominance values of the second pixel in the pair, are less likely to recover such text information, resulting in a likelihood of the text information being corrupted.

Various further aspects and features of the present invention are defined in the appended claims.

BRIEF DESCRIPTION OF DRAWINGS

Embodiments of the present invention will now be described by way of example only with reference to the accompanying drawings, where like parts are provided with corresponding reference numerals, and in which:

FIG. 3A is a representation of an example colour image, including text information; FIG. 3B is a representation of the example colour image of FIG. 3A after compression using a conventional 4:2:2 compression processing;

FIG. 7A is a representation of the colour image of FIG. 3A after compression processing; FIG. 7B is a representation of the example colour image of FIG. 3A after de-compression by the image processor shown in FIG. 6.

DESCRIPTION OF PREFERRED EMBODIMENTS

Figure 1:
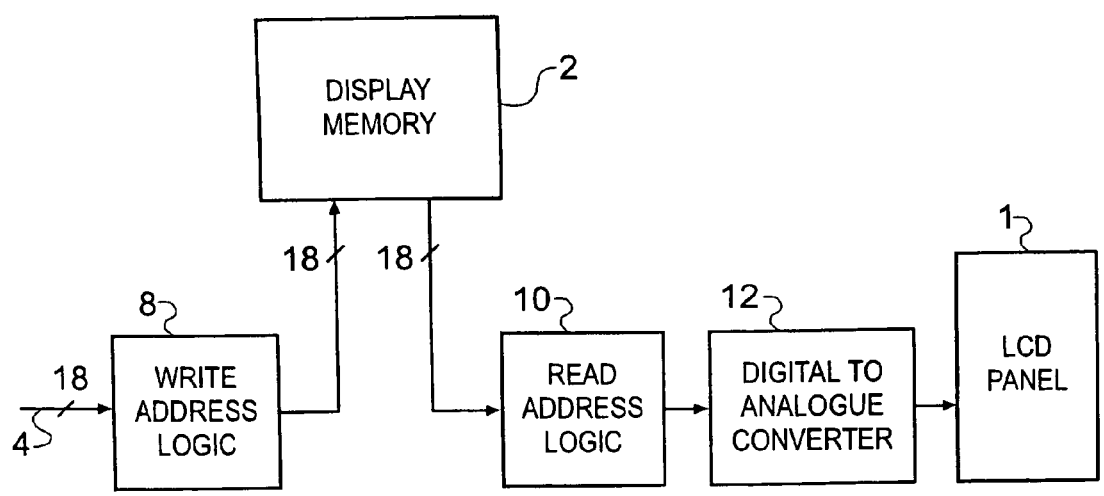
FIG. 1 is a schematic block diagram of an LCD display module.

An embodiment of the present invention will now be described with reference to an LCD display module. FIG. 1 provides an illustration of a typical LCD display module such as that which would be used within a mobile radiotelephone or a personal digital assistant. Generally, there is an increasing demand to display digital images using hand held devices such as mobile radiotelephones. In particular, third generation (3G) mobile radio telecommunications systems will provide a facility for communicating colour images and so mobile radiotelephones for 3G systems will require a facility for displaying such digital colour images.

A typical display module for displaying colour images includes an LCD display panel 1 as shown in FIG. 1. Such a display module comprises a display memory 2 which is arranged to store pixel information representative of a digital image which is to be displayed on the LCD display panel 1. Pixels which are representative of the colour image to be displayed are received on a connecting channel 4 and written into the display memory 2 using write address logic 8. When the image is to be displayed, the signal samples, stored in the memory 2, are read by read address logic 10 and converted into the analogue domain by a digital to analogue converter 12 before being displayed on the LCD panel 1.

As already explained, the present invention provides a facility for reducing an amount of data storage capacity which is required to store the digital colour image, whilst maintaining the quality of the image to be displayed on, for example, the LCD panel 2. As will be explained, the present invention provides a particular advantage when the image contains fine detail or fine text information, for example, where part of a text character is only one pixel wide.

Figure 2:
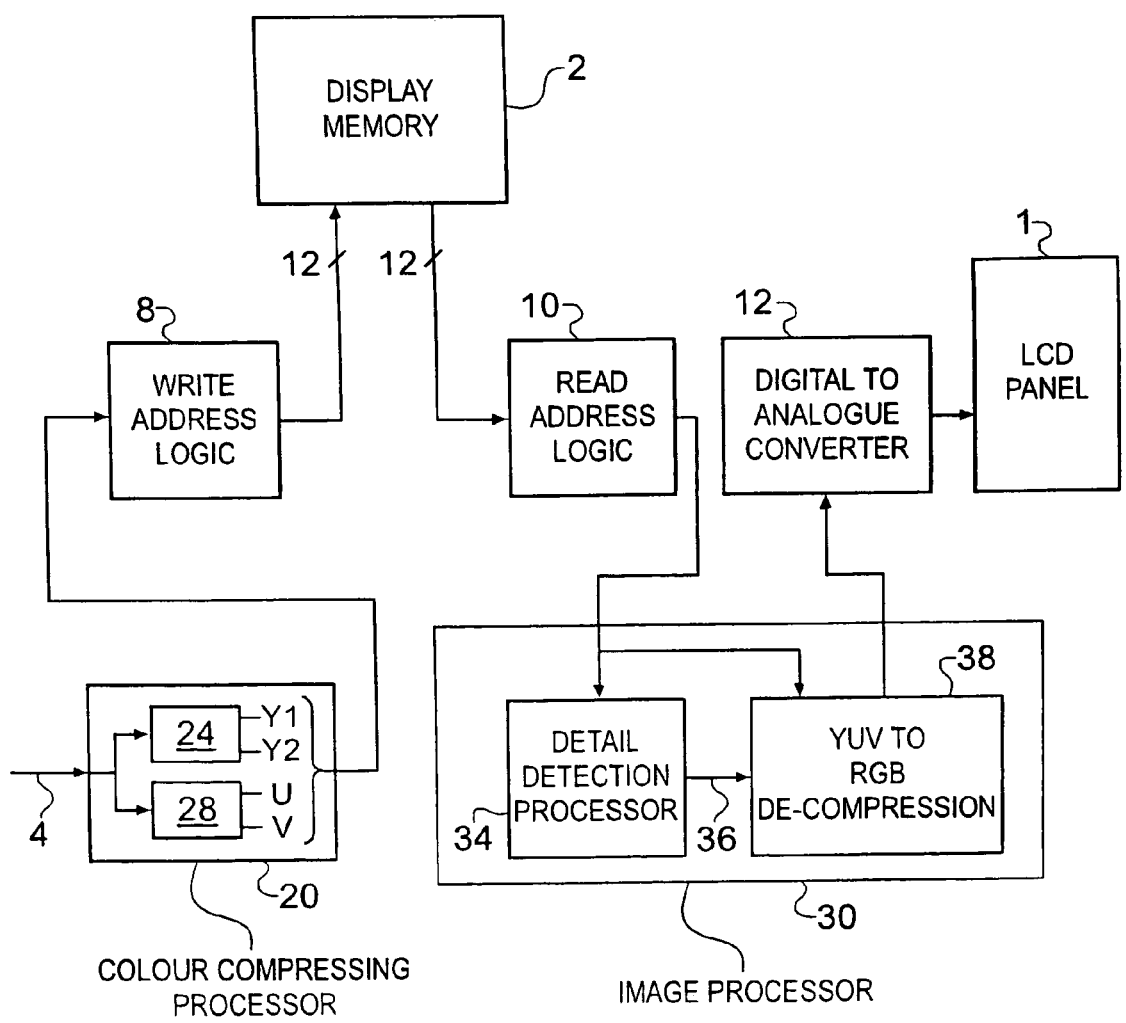
FIG. 2 is a schematic block diagram of an LCD display module including a colour compressing processor and an image processor according to an embodiment of the invention.

An embodiment of the present invention is illustrated in FIG. 2. FIG. 2 shows the LCD display module of FIG. 1 in combination with a colour compressing processor 20 and an image processor 30. In order to reduce the storage capacity of the display memory 2, the colour compressing processor 20 is arranged to receive the pixels representative of the colour image and to reduce the number of samples which are used to represent the image by processing the pixels of the image. Correspondingly, when the signal samples representing the image are read from the display memory 2, then the image processor 30 is arranged to decompress the signal samples to recover the pixels of the image so that the image can be displayed on the LCD panel 1. For the present example, it is assumed that the pixels of the image received on the connecting channel 4 are represented as 6 bit samples for each of the colour components RGB, although it will be appreciated that other numbers of bits per sample may be used.

As already explained, a particular problem with conventional RGB to YUV colour compression processing, such as that referred to as 4:2:2, is that where text or detail exists in the image, the clarity of this text may be reduced. Such detail may be blurred as a result of colour components being discarded in order to form the compressed image. A result of compressing an example colour image using conventional 4:2:2 processing is illustrated in FIG. 3(a) and FIG. 3(b). FIG. 3(a) provides an example image including text information. As illustrated in FIG. 3(b), a result of using conventional 4:2:2 compression encoding in which the chrominance values UV are discarded for every other pixel, is that the fine text information is either blurred or the colour is lost or corrupted producing an unsatisfactory reproduced image.

Embodiments of the present invention therefore seek to compress the digital image whilst preserving such fine text information in the recovered image. To this end, the colour compressing processor 20 is arranged to form U and V values for a pair of pixels by averaging the corresponding U and V chrominance values for each pixel pair. As shown in FIG. 2, the colour compressing processor comprises a luminance forming circuit 24 and a chrominance forming circuit 28. An embodiment of the colour compressing processor 20 is shown in FIGS. 4 and 5.

Figure 4:
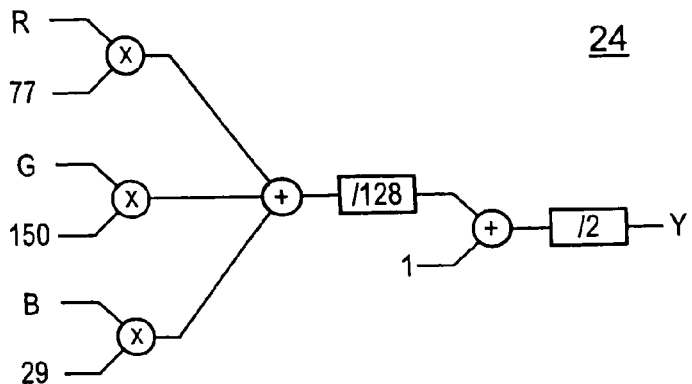
FIG. 4 is a schematic block diagram of a luminance generating circuit forming part of the colour compressing processor shown in FIG. 2.
Figure 5:
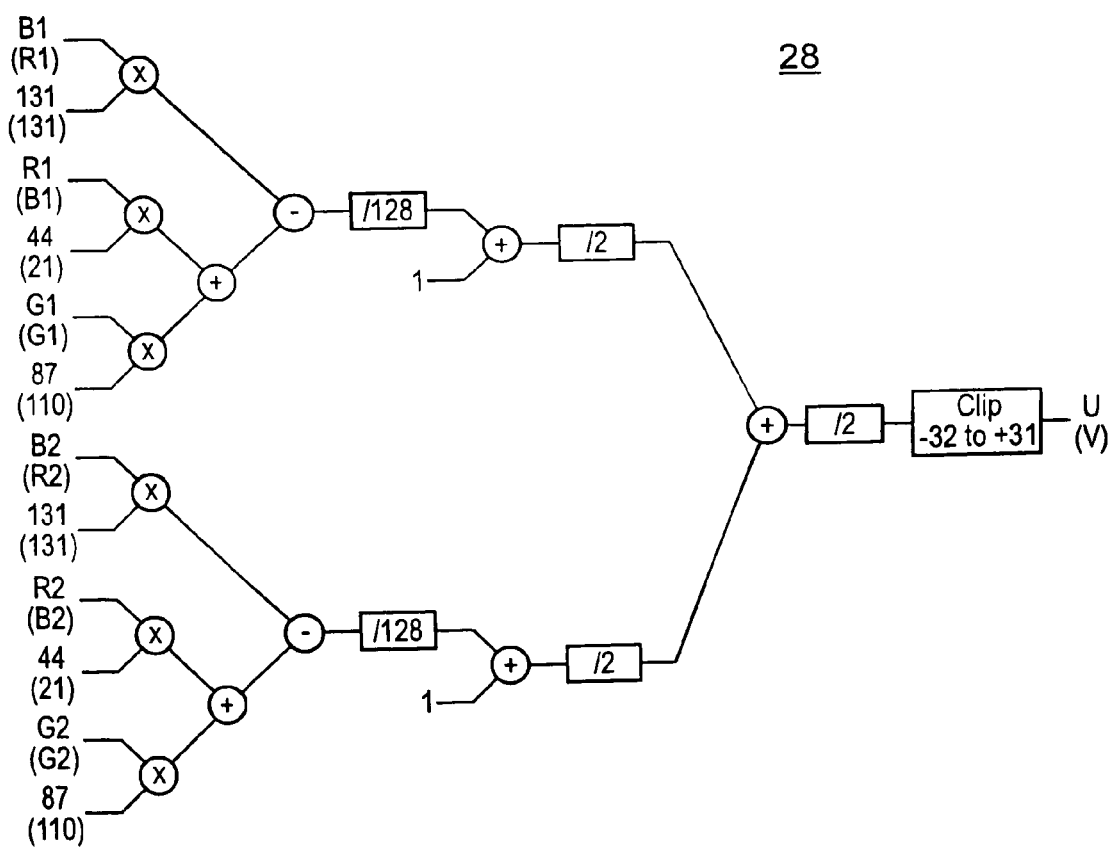
FIG. 5 is a schematic block diagram of a chrominance generating circuit forming part of the colour compressing processor shown in FIG. 2.

FIG. 4 provides a functional block diagram of the luminance forming circuit 24 which forms the luminance value Y from the RGB values of each pixel. The calculation performed by circuit in FIG. 4 is expressed in the equation below:

$$Y=(77R+150G+29B)/128 \qquad 1)$$

$$Y=(Y+1)/2 \qquad 2)$$

Forming the luminance value Y for each pixel using the functional block diagram illustrated in FIG. 4, generates a luminance value which maps the 6 bit values of the RGB components onto a 6 bit luminance value in the range between −32 and +31.

FIG. 5 provides an illustration of a functional block diagram of the chrominance forming circuit 28. The calculation performed by the chrominance forming circuit 28 is illustrated by the equations below:

$$U=(131B-(44R+87G))/128 \qquad 1)$$

$$V=(131R-(110G+21B))/128$$

$$U=(U+1)/2 \qquad 2)$$

$$V=(V+1)/2$$

In FIG. 5 the values given in brackets are those which are used for forming the second chrominance value V. As with the luminance forming circuit 24, the chrominance forming circuit 28 has an advantage in providing a 6 bit value for the U and V components generated from the 6 bit input RGB components, which produces values in the range −32 to +31.

As illustrated in FIG. 5, the chrominance forming circuit 28 is arranged to generate two chrominance values UV for two input pixels, that is, two input pixels each having RGB values. More particularly, the two chrominance values UV are formed by averaging the corresponding chrominance values U1, V1 and U2, V2 which are formed for each pixel. Thus, unlike conventional compression processing the second two chrominance values U2, V2 are not discarded but combined to form a common chrominance values for the two input pixels.

Returning to FIG. 2, the write address logic 8 is arranged to store the component signal samples representative of the image in the display memory 2. Four samples are stored to represent two pixels otherwise requiring six samples, thereby providing a 33% saving in the memory capacity for this example. The samples are stored in the display memory 2 as Y1U and Y2V.

Compressing the pixels by forming common chrominance values UV for each pair of pixels provides a particular advantage in overcoming the technical problem illustrated in FIGS. 3(*a*) and 3(*b*) in which text information can be corrupted. This advantage will be understood following explanation of the operation of the de-compression process provided by the image processor 30.

As shown in FIG. 2, the image processor 30 comprises a detail detection processor 34 and a YUV to RGB de-compression processor 38. YUV compressed samples are received by the detail detection processor 34 and the YUV to RGB de-compression processor 38 from the read address logic 10. The detail detection processor is arranged to control the YUV to RGB de-compression processor 38 in order to recover the RGB values in a way, which preserves the text information. The image processor 30 is shown in more detail in FIG. 6.

Figure 6:
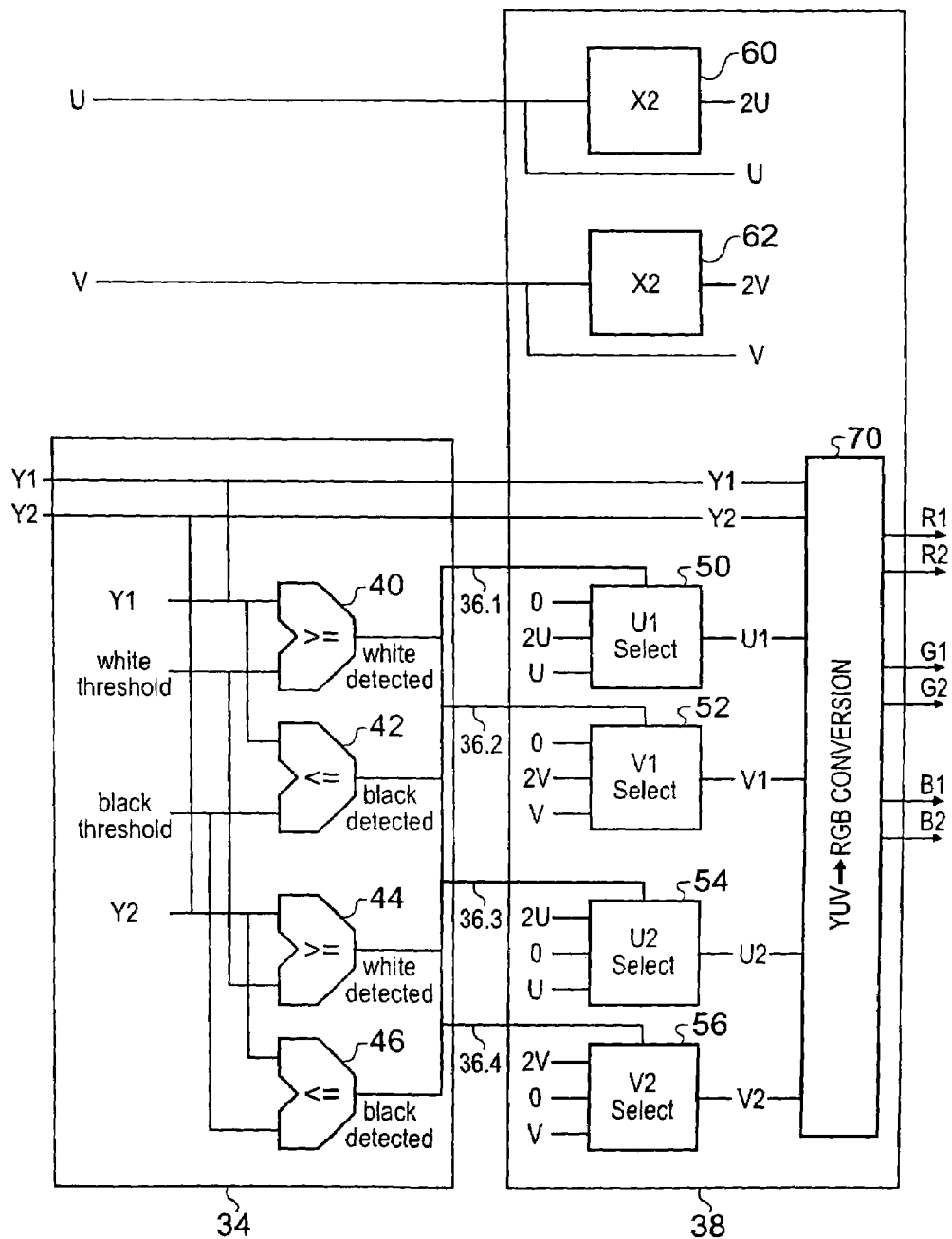
FIG. 6 is a schematic block diagram of the image processor shown in FIG. 2.

As illustrated in FIG. 6, the detail detection processor comprises for each luminance value a pair of comparators 40, 42, 44, 46. Each of the comparators compares one of the luminance values with a threshold value representing white and a threshold value representing black. The comparators 40, 42, 44, 46 therefore determine whether either of the luminance values Y1, Y2 are representative of white or black.

As will be appreciated, the threshold values provided to the comparators 40, 42, 44, 46 are selected effectively to identify that one of the two pixels is representative of white or almost white or black or almost black. Detection is determined if either luminance value exceeds the white threshold or is lower than the black threshold. The presence of white or black in one pixel but not the other reflects a change in the image from one pixel to another of the pixel pair, which is likely to represent the presence of detail or text information in the image.

Control signals representative of a result of the comparisons performed by the comparators 40, 42, 44, 46 are fed to the YUV to RGB de-compression processor 38. The control signals are received at selection logic gates 50, 52, 54, 56. Consequent upon the output from the comparators received on the connection channels 36.1, 36.2, 36.3, 36.4, the selection gates 50, 52, 54, 56 select either the value of zero, twice the value of the input chrominance values U or V, or the input chrominance value U or V. Correspondingly therefore, the selection gates, 50, 52, 54, 56 produce at each respective output, reproduced chrominance values U1, V1, U2, V2.

Also forming part of the de-compression processor 38 are multiplying circuits 60, 62. The multiplying circuits are arranged to produce twice the value of the corresponding input chrominance values U, V and the input chrominance values U, V which are fed to the selection gates 50, 52, 54, 56.

Having reproduced the chrominance values for each pixel U1, V1 and U2, V2, a YUV to RGB conversion processor 70 is arranged to convert the YUV component values for the first pixel Y1, U1, V1 and the second pixel Y2, U2, V2 into the RGB values of the reproduced pixel pair. Therefore for each group of component signal samples Y1UY2V a pixel pair is formed, which is represented as R1G1B1, R2G2B2. As shown in FIG. 2, the RGB values are then fed to the digital to analogue converter 12 for display on the LCD panel 2.

According to the operation of the detail detection processor 34, in combination with the de-compressing processor 38, a functional arrangement is formed for the regeneration of the YUV values for each pair of pixels. The functional arrangement is represented by the following algorithm:

1) Pixel 1 (Y1) represents white or black and pixel 2 (Y2) represents not white or black then:

Y1=Y1, U1=0, V1=0

Y2=Y2, U2=Ux2, V2=Vx2

2) Pixel 1 (Y1) represents not white or black and pixel 2 (Y2) represents white or black:

Y1=Y1, U1=Ux2, V1=Vx2

Y2=Y2, U2=0, V2=0

3) For all other pixels:

Y1=Y1, U1=U, V1=V

Y2=Y2, U2=U, V2=V

The colour compressing processor 20 and image processor 30 operate in combination to compress the amount of data required to represent an image whilst preserving text information. For the image illustrated in FIG. 3(*a*), a result of processing by the colour compressing processor 20 and the image processor 30 is illustrated in FIGS. 7(*a*) and 7(*b*). FIG. 7(*a*) illustrates the text of the image in FIG. 3(*a*) which results when the colour compressing processor has processed the pixels of the image in a way which reduces the chrominance components. As illustrated, there is substantial blurring in this image resulting from the averaging performed by the colour compressing processor in order to form the two chrominance values. However, as shown in FIG. 7(*b*), a result of de-compressing the compressed colour image as performed by the image processor 30, according to an embodiment of the invention, is to recover the original image with the effect of retaining the text detail.

As will be appreciated by those skilled in the art, various modifications may be made to the embodiments herein before described without departing from the scope of the present invention. In particular, it will be appreciated that the colour compressing processor and the image processor may be used in combination with any type of display. The invention is therefore not limited to applications with an LCD display. Embodiments of the present invention find particular application where there is a requirement to reduce memory size or components of a product requiring a facility for displaying colour images. It will be appreciated that the invention finds application with colour depth values other than 18-bits such as 24-bits. For larger colour depth values such as 24-bits, the reduction in memory size will be even greater in accordance with the size of the colour component signal samples.

The invention claimed is:

1. An image processing apparatus configured to reproduce pixels representative of a colour image from groups of colour component signal samples representing the image, each of said groups representing two of said pixels and comprising two input luminance values, one for each pixel, and first and second input chrominance values formed by averaging first and second chrominance values for each pixel, said apparatus comprising:

a de-compressing processor configured to receive said groups of colour component signal samples and to generate reproduced pixels, each comprising three colour component values, and a detail detection processor configured to detect whether one of said first and second pixels is representative of substantially white or substantially black and the other of said pixels is not representative of substantially white or substantially black, and if so, arranging for said de-compressing processor, to assign to first and second chrominance values for the one of said first and second pixels representing substantially white or black the value of zero, to assign to first and second chrominance values for the other of said first and second pixels, not representing substantially white or black, twice the value of the first and second input chrominance values respectively, and to reproduce the three colour components of each pixel from the corresponding input luminance value and the assigned first and second chrominance values, and otherwise to reproduce the three colour components of each pixel from the corresponding input luminance value in combination with the first and second input chrominance values.

2. An image processing apparatus as claimed in claim 1, wherein said detail detection processor is configured to compare first and second input luminance values of each group with white and black threshold values, each representative of substantially white and substantially black luminance values respectively and to determine whether one of said pixels is representative of substantially white or substantially black and the other of said pixels is not representative of substantially white or substantially black, in accordance with the result of the comparison.

3. An image processing apparatus as claimed in claim 2, wherein the comparison performed by said detail detection processor comprises:

determining whether said first input luminance value exceeds said white threshold value or said first input luminance value is less than said black threshold value, and determining whether said second input luminance value exceeds said white threshold value or said second input luminance value is less than said black threshold value.

4. A display device, comprising:

a display, a display memory, a colour processor configured to process input pixels, each comprising three colour component signal samples, to produce output colour component signal samples, said colour processor being configured to receive first and second input pixels and to generate from each said pixel a corresponding luminance value from the corresponding three colour component samples of each pixel respectively, and to form first and second output chrominance values from said first and second input pixels by calculating from each of the colour components of each pixel first and second chrominance values, and averaging the values of the first chrominance values for the first and second input pixels and averaging the second chrominance values for the first and second pixels, to produce said first and second output chrominance values respectively, said output colour component signal samples being formed for said first and second pixels from said corresponding luminance value for each pixel and said first and second output chrominance values, and an image processing apparatus comprising a de-compressing processor configured to receive said groups of colour component signal samples and to generate reproduced pixels, each comprising three colour component values, and a detail detection processor configured to detect whether one of said first and second pixels is representative of substantially white or substantially black and the other of said pixels is not representative of substantially white or substantially black, and if so, arranging for said de-compressing processor, to assign to first and second chrominance values for the one of said first and second pixels representing substantially white or black the value of zero, to assign to first and second chrominance values for the other of said first and second pixels, not representing substantially white or black, twice the value of the first and second input chrominance values respectively, and to reproduce the three colour components of each pixel from the corresponding input luminance value and the assigned first and second chrominance values, and otherwise to reproduce the three colour components of each pixel from the corresponding input luminance value in combination with the first and second input chrominance values, wherein input pixels representative of a colour image are fed to said colour processor and groups of signal samples representing said pixels produced by said colour processor are stored in a display memory, and groups of signal samples are read out from said display memory and processed by said image processing apparatus to generate reproduced pixels before being displayed by a display device.

5. A display device as claimed in claim 4, wherein said display is a Liquid Crystal Display (LCD).

6. A display device as claimed in claim 4, wherein reproduced pixels generated by said image processing apparatus are converted to analogue form by an analogue-to-digital converter for display on said LCD display.

7. A portable computing or communicating device having a display device according to claim 4.

8. A mobile radiotelephone having a display device as claimed in claim 4.

9. A method implemented on one or more processors of processing a colour image to reproduce pixels of an imaging unit representative of the colour image from groups of colour component signal samples representing the image, each of said groups representing two of said pixels and comprising two input luminance values, one for each pixel, and first and second input chrominance values formed by averaging first and second chrominance values for each pixel, said method comprising, using one or more processors to perform the steps of:

receiving one of said groups of signal samples representative of first and second pixels of the imagine unit;

detecting whether one of said first and second pixels is representative of substantially white or substantially black and the other of said pixels is not representative of substantially white or substantially black, and if so reproducing to first and second chrominance values for the one of said first and second pixels representing substantially white or black the value of zero, reproducing to first and second chrominance values for the other of said first and second pixels the value of twice the value of the first and second input chrominance values respectively, and generating three colour components for each of said first and second reproduced pixels from the input luminance values and the assigned chrominance values; and otherwise generating three colour components of each of said first and second reproduced pixels from the corresponding input luminance value in combination with the first and second input chrominance values.

10. The method according to claim 9, further comprising:

receiving first and second input pixels and generating from each pixel a corresponding luminance value from the three colour component samples of the pixel, and forming first and second output chrominance values for said first and second input pixels by calculating from each of the colour components of each pixel first and second chrominance values, and averaging the value of the first chrominance values of the first and second pixels and averaging the second chrominance values of the first and second pixels, to produce said first and second output chrominance values respectively, said output colour component signal samples being formed for said first and second input pixels from said corresponding luminance values for each input pixel and said first and second output chrominance values.

* * * * *